(12) United States Patent
Little (10) Patent No.: US 7,937,497 B2
(45) Date of Patent: May 3, 2011

(54) APPARATUS FOR SELECTIVELY COPYING AT LEAST PORTIONS OF MESSAGES IN A DISTRIBUTED COMPUTING SYSTEM

(75) Inventor: Mark Cameron Little, Ebchester (GB)

(73) Assignee: Red Hat, Inc., Raleigh, NC (US)

(*) Notice: Subject to any disclaimer, the term of this patent is extended or adjusted under 35 U.S.C. 154(b) by 765 days.

(21) Appl. No.: 11/809,829

(22) Filed: May 31, 2007

(65) Prior Publication Data

US 2008/0301286 A1  Dec. 4, 2008

(51) Int. Cl.
*G06F 13/00* (2006.01)
(52) U.S. Cl. ........................................ 709/246
(58) Field of Classification Search .................. 709/203, 709/206, 238
See application file for complete search history.

(56) References Cited

U.S. PATENT DOCUMENTS

| | | | |
|---|---|---|---|
| 5,283,856 A | 2/1994 | Gross et al. | |
| 5,590,277 A | 12/1996 | Fuchs et al. | |
| 6,073,142 A | 6/2000 | Geiger et al. | |
| 6,496,862 B1 | 12/2002 | Akatsu et al. | |
| 6,854,108 B1 | 2/2005 | Choi | |
| 7,080,078 B1 | 7/2006 | Slaughter et al. | |
| 7,159,224 B2 | 1/2007 | Sharma et al. | |
| 7,185,342 B1 | 2/2007 | Carrer et al. | |
| 7,539,746 B2 | 5/2009 | Bankier et al. | |
| 7,603,715 B2 | 10/2009 | Costa et al. | |
| 7,653,679 B2 | 1/2010 | Kantor et al. | |
| 2001/0048735 A1 | 12/2001 | O'Neal | |
| 2002/0046292 A1 | 4/2002 | Tennison et al. | |
| 2002/0062342 A1 | 5/2002 | Sidles | |
| 2002/0174415 A1 | 11/2002 | Hines | |
| 2005/0108384 A1 | 5/2005 | Lambert et al. | |
| 2006/0129650 A1* | 6/2006 | Ho et al. | 709/207 |
| 2006/0149788 A1 | 7/2006 | Bosloy et al. | |
| 2006/0212593 A1 | 9/2006 | Patrick et al. | |
| 2007/0016613 A1* | 1/2007 | Foresti et al. | 707/104.1 |
| 2007/0130272 A1 | 6/2007 | Jordan, Jr. | |
| 2007/0156430 A1 | 7/2007 | Kaetker et al. | |
| 2007/0198437 A1 | 8/2007 | Eisner et al. | |
| 2007/0198676 A1 | 8/2007 | Vertes | |
| 2008/0086730 A1 | 4/2008 | Vertes | |
| 2008/0155342 A1 | 6/2008 | O'Callahan | |

OTHER PUBLICATIONS

King, Erik, "Perpetual Enterprise Management Service (PEMS) for Next Generation SOA-based Command & Control Systems", Jun. 2005, 26 pages.
King, Erik, "Perpetual Enterprise Management Service (PEMS) for C2 SOA Deployments", Jun. 14, 2005, 23 pages.

(Continued)

*Primary Examiner* — Robert B Harrell
(74) *Attorney, Agent, or Firm* — Blakely, Sokoloff, Taylor & Zafman LLP (57) ABSTRACT

A method and apparatus for using a persistent message store in a distributed computing system having a service oriented architecture. A message is detected that is transmitted from a message producer to a message consumer in the distributed computing system having the service oriented architecture. A determination is made as to whether the message should be copied based on at least one predetermined criterion. A copy of the message is generated if the message is to be copied. The copy of the message is stored in the persistent message store.

23 Claims, 5 Drawing Sheets

OTHER PUBLICATIONS

Vasudevan, Venu, "A Web Services Primer," XML.com, Published on XML.com http://www.xml.com/pub/a/ws/2001/04/04/webservices/index.html, May 30, 2007, http://webservices/xml/com/lpt/a/760, pp. 1-10.

Mega, Giuliano, et al., "Debugging Distributed Object Applications With the Eclipse Platform," Department of Computer Science, University of Sao Paulo, Copyright 2004 By ACM, Inc., pp. 1-5.

Satyanarayanan, M., et al., "Transparent Logging as a Technique for Debugging Complex Distributed Systems," School of Computer Science, Carnegie Mellon University, Pittsburgh, PA 15213, Apr. 17, 1992, pp. 1-3.

Tarafdar, Ashis, et al., "Debugging in a Distributed World: Observation and Control," The University of Texas at Austin, Austin, TX, 78712-1188, pp. 1-6.

Mittal, Neeraj, et al., "Debugging Distributed Programs Using Controlled Re-execution," The University of Texas at Austin, Austin, TX, 78712-1188, pp. 1-10.

"Enterprise Service Bus," from Wikipedia, http://en.wikipedia.org/wiki/Enterpise_service_bus, May 30, 2007, pp. 1-4.

"Overview of JBossESB," JBoss.org: community drive, http//labs.jboss.com/jbossesb/resources/Overview.html, May 30, 2007, 2 pages.

"JBossESB Requirements and Architecture, Version: 0.3," May 2, 2006, pp. 1-12.

Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.

"Enterprise Integration Patterns—Message Store," Enterprise Integration Patterns, http://www.enterpriseintegrationpatterns.com/MessageStore.html, pp. 1-2.

"Service Component Architecture," IBM, http://www-128.ibm.com/developerworks/library/specification/ws-sca, Mar. 13, 2007, pp. 1-3.

"Service-Oriented Architecture," from Wikipedia, http://en.wikipedia.org/wiki/Service-oriented_architecture, May 30, 2007, pp. 1-12.

Hunt, John, "The Holy Grail of Services: SCA," *Reg Developer >> Code >> Java/J2EE, Original URL: http://www.regdeveloper.co.uk/2007/03/13/sca_for_soa/*, http://www.regdeveloper.co.uk/2007/03/13/sca_for_soa/print.html, Mar. 14, 2007, pp. 1-6.

"Web Services Context Specification (WS-Context)," OASIS, Committee draft version 0.8, Version created Nov. 3, 2004, Editors, Mark Little, et al., Copyright © 2004 The Organization for the Advancement of Structured Information Standards [Appendix A], pp. 1-23.

"Web Service Endpoint Identification and Resolution: Use Cases and Requirements," Version 1.0, GWD-I (draft-ggf-wse-id-usecases-1.0-3), Open Grid Services Architecture Working Group, Editors: F. Siebenlist, ANL, et al., Apr. 21, 2006, ogsa-wg@ggf.orq, pp. 1-16.

"Why ESB and SOA? " Version 0.3, Date: Jan. 27, 2006, pp. 1-7.

Notice of Allowance for U.S. Appl. No. 11/809,557 (P143), mailed Apr. 30, 2010.

Office Action for U.S. Appl. No. 11/809,557 (P143), mailed Sep. 30, 2009.

Office Action for U.S. Appl. No. 11/894,331 (P106X), mailed Dec. 7, 2010.

\* cited by examiner

APPARATUS FOR SELECTIVELY COPYING AT LEAST PORTIONS OF MESSAGES IN A DISTRIBUTED COMPUTING SYSTEM

TECHNICAL FIELD

Embodiments of the present invention relate to distributed systems, and more specifically to use of a persistent message store in a service oriented architecture.

BACKGROUND

Periodically, applications and services in a distributed system terminate abnormally. Often, an abnormal termination is caused by a state change that should not have occurred. In a distributed computing environment, it can be difficult and time consuming to determine a cause of the abnormal termination. This may be especially true for distributed computing environments that include non-deterministic components (e.g., applications or services).

Debugging in a non-deterministic system is more difficult than debugging in a deterministic system. In a deterministic system, given some set of input messages, the same state will always be achieved, and the same output will always be produced. Therefore, a fault may be recreated by applying the same set of inputs (e.g., messages) that originally caused the fault. In a non-deterministic system, on the other hand, a single set of input messages may cause different states, and induce different output messages to be generated. Therefore, it may require upwards of 100 or more executions to recreate a fault.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for using a persistent message store in a distributed computing system having a service oriented architecture. In one embodiment, a message is detected that is transmitted from a message producer to a message consumer. Both the message producer and the message consumer may be services or clients in a service oriented architecture. A determination is made as to whether the message should be copied. The determination is made by a rules engine based on predefined criteria. If the determination is positive, a copy of the message is generated, and recorded in a persistent message store. The copy of the message may be available for error checking or for checking an audit trail.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "deleting", "transforming", "determining", "storing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 1:
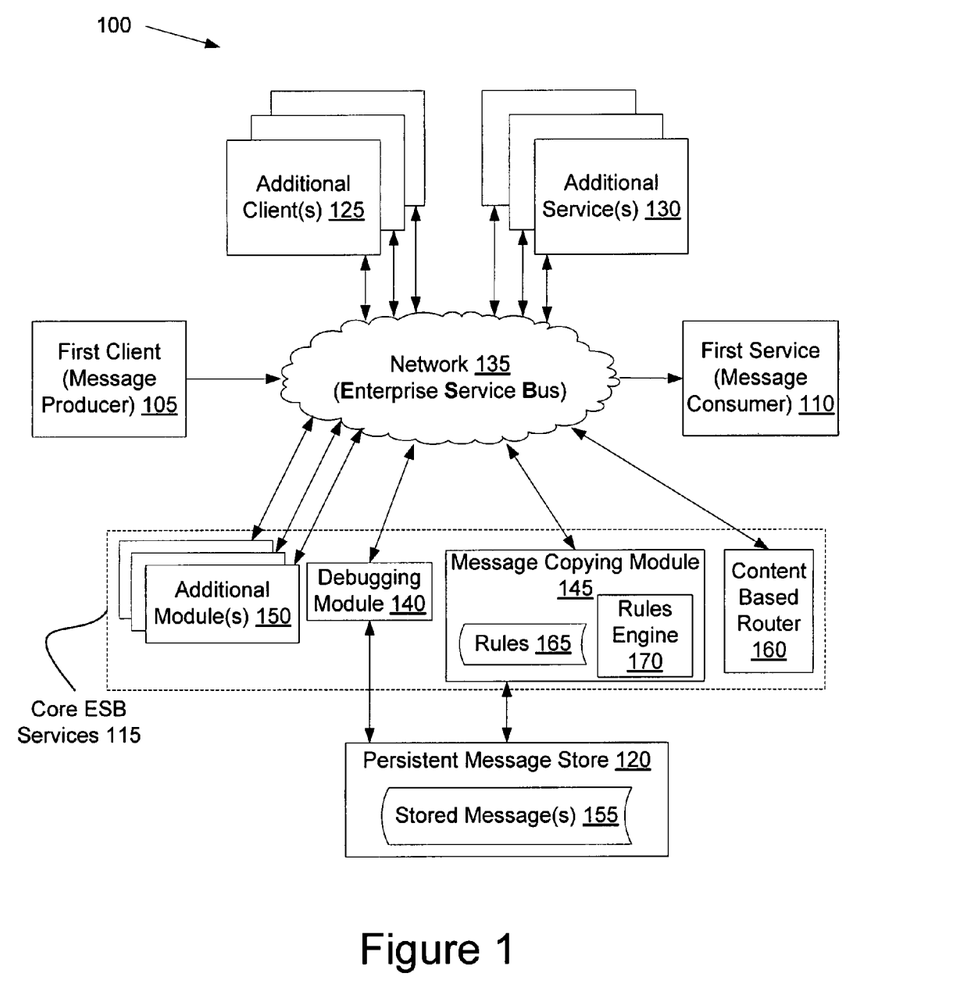
FIG. 1 illustrates an exemplary distributed system, in which embodiments of the present invention may operate.

FIG. 1 illustrates an exemplary distributed system 100, in which embodiments of the present invention may operate. In one embodiment, the distributed system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed system 100 may include clients (e.g., first client 105 and additional clients 125) and services (e.g., first service 110, additional services 130 and core ESB services 115), connected via a network 135. Each of the clients 105 and 125 and services 110, 115, 130 may be both message producers and message consumers, as described below. The distributed system 100 may also include a persistent message store 120 connected with one or more of the core ESB services 115.

The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based massaging engine that provides services for more complex architectures. The ESB provides an infrastructure that links together services 110, 115, 130 and clients 105 and 125 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients 105 and 125 may be, for example, personal computers (PC), palm-sized computing devices, personal digital assistants (PDA), etc. Clients 105 and 125 may also be applications run on a PC, server, database, etc. In the SOA, clients 105 and 125 include applications that access services 110 and 130. Clients 105 and 125 may be fat clients (clients that perform local processing and data storage), thin clients (clients that perform minimal or no local processing and minimal to no data storage), and/or hybrid clients (clients that perform local processing but little to no data storage).

In the illustrated embodiment, the first client 105 is a message producer. Alternatively, additional clients 125, first service 110, additional services 130 or core ESB services 115 may be message producers. A message producer is a client or service that generates a message. Messages include data that may convey information to, or initiate an event on, a message consumer (e.g., a service or client). A message may be generated for any of a myriad of purposes. For example, the message may be generated to report a purchase of a good, to request contact information, to begin a remote process (e.g., initiate a service), etc.

In one embodiment, a message includes a message header, a message context and a message body. The message header may include a unique message identifier and routing information (e.g., recipient, sender, message priority, etc.). The message header may be used to identify the message, and to route the message to end points (recipients) intended by the message producer and/or as determined by the ESB (e.g., by a router within the ESB). The message may be directed to a specific endpoint (e.g., a specific client or service). Alternatively, the message may be posted to an intermediate location, which one or more endpoints may communicate with to receive the message.

The message context may include properties that support compatibility between services and clients (e.g., between the message producer and message consumers). The message context may provide, for example, custom fields or filters, transactional information (e.g., to identify a distributed transaction or session associated with the message), security information (e.g., authorization information, authentication information, etc.), and so on.

The message body may include data to which a client or service may respond (e.g., by initiating an event). The content and configuration (layout) of the message body may determine a message type. Examples of message types include text messages, map messages, bytes messages, stream messages and object messages. Other message types are also possible. In one embodiment, the message body is formatted using an extensible markup language (XML). Use of XML allows flexible information formats to be implemented. Other flexible information formats, such as standard generalized markup language (SGML) may also be used for the message body.

Services 110 and 130 may be discretely defined sets of contiguous and autonomous functionality (e.g., business functionality, technical functionality, etc.). Services 110 and 130 may be resident on personal computers (PC), servers, routers, etc. Each service 110 and 130 may represent a process, activity or other resource that can be accessed and used by other services or clients on network 135. Each service 110 and 130 may be independent of other services 110 and 130, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

In the illustrated embodiment, the first service 110 is a message consumer. Alternatively, first client 105, additional clients 125, core ESB services 115 or additional services 130 may be message consumers. A message consumer receives a message generated by a message producer. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc.

In one embodiment, the distributed system 100 includes an ESB that has a collection of core ESB services 115. The core ESB services 115 act on messages that flow through the ESB. Messages can also be directed towards any of the core ESB services 115 in the same manner as described above with reference to the first service 110 and additional services 130. Any of the core ESB services 115 may include one or more general purpose computing devices (e.g., personal computer or server) and/or a special purpose computing devices configured to act on messages that flow between message producers (e.g., clients or services) and message consumers (e.g., clients or services) within the ESB.

In one embodiment, the core ESB services 115 include a content based router 160. The content based router 160 is a service of the ESB that monitors the network 135 for messages, and routes the messages between clients and services. The content based router 160 may be transparent to both message producers and message consumers.

The content based router 160 may route all messages that flow through the ESB, or a subset of all messages. In one embodiment, the content based router 160 routes messages according to routing information included in message headers. Alternatively, content based router 160 may route messages based on information contained within the message (e.g, based on the message header, message context, and/or message body). In a further embodiment, the content based router 160 includes a configurable rules engine that determines a destination channel (route to a client or service) based on a set of configurable rules.

In one embodiment, the core ESB services 115 include a message copying module 145. The message copying module 145 may be connected with the ESB and with persistent message store 120. The message copying module 145 monitors the network 135 for all messages that flow through the ESB, and generates copies of some or all of such messages. The messages may be copied in a manner that is transparent to both message consumers and message producers. The message copies may be stored in the persistent message store 120. In one embodiment, the message copying module 145 is included in the content based router 160.

In one embodiment, the message copying module 145 generates a copy of each message that flows through the ESB. Alternatively, message copying module 145 may copy a subset of all messages. For example, an administrator may not be interested in copying all messages that flow through the ESB. In such a case, messages may be stored, for example, only for high priority clients and/or services.

In one embodiment, the message copying module 145 includes a rules engine 170 and one or more rules 165. The rules engine 170 and rules 165 may be used to determine whether to copy messages, where to store messages, what formats and/or structures to use for storing messages, etc. Such decisions may be made based on message contents (e.g., message header, message context, message body, etc.). For example, a first rule may specify that messages produced by client A should be stored in a first file, and a second rule may specify that messages produced by client B should be stored in a second file. In another example, storage of messages may be restricted where prior agreement allowing copies of the messages to be generated has not been obtained. In such an instance, rules 165 may enable the message copying module 145 to only copy messages generated by parties that have agreed to have their messages copied. Alternatively, rules 165 may proscribe certain portions of a message from being copied, but permit copying of other portions of the message. Where portions of a message are not copied, information may be added to the copied message (e.g., to a header) indicating that portions of the message were not copied, and why such portions were left out.

In one embodiment, the core ESB services 115 include a debugging module 140. The debugging module 140 may be connected with the ESB and with the persistent message store 120. Debugging module 140 may use stored messages 155 in the persistent store 120 to debug distributed system 100. The debugging module 140 may debug the distributed system 100 as described below with reference to FIG. 5.

Returning to FIG. 1, the core ESB services 115 may include one or more additional modules 150, each of which may be a service of the ESB. Examples of additional modules 150 include modules that provide services for redirecting a message from an original intended endpoint, splitting a message into multiple messages, combining multiple messages into a single message, transforming messages from a first format to a second format, applying rules to a message, etc. Each additional module 150 may provide a service to clients 105 and 125 and/or services 110 and 130 of the distributed computing system 100.

Persistent message store 120 receives and stores message copies from message copying module 145. Persistent message store 120 may reside on a single storage device, or on multiple networked storage devices at the same or different locations, each of which may include RAM, a hard disk drive, optical drives, etc. Persistent message store 120 may be a database, a file system, a repository, etc. Stored messages 155 within the persistent message store 120 may be audited (online or offline) to verify that they were successfully sent and/or received. Stored messages 155 may be accessed by clients or services, for example, to identify failed and successful transactions, to verify that messages have been sent, to error check distributed system 100, etc.

In one embodiment, message copies are stored in the persistent message store 120 with one or more keys such that the messages are searchable based on one or more search criteria. Messages may be searchable by one or more of a sender identity, a receiver identity, a timestamp, or other message header information or message context information. Messages may also be searchable by message type, message body content, or other message parameters, such as whether a message contains information about errors (known as fault messages) or a transport medium used (e.g., FTP, HTTP, etc.). For example, a search may be made that retrieves all messages that were sent from a first client to a first service during a specified time period. In a further example, a search may be made the retrieves all messages that were sent form the first client to the second client during the specified time period using a file transfer protocol (FTP).

Figure 2:
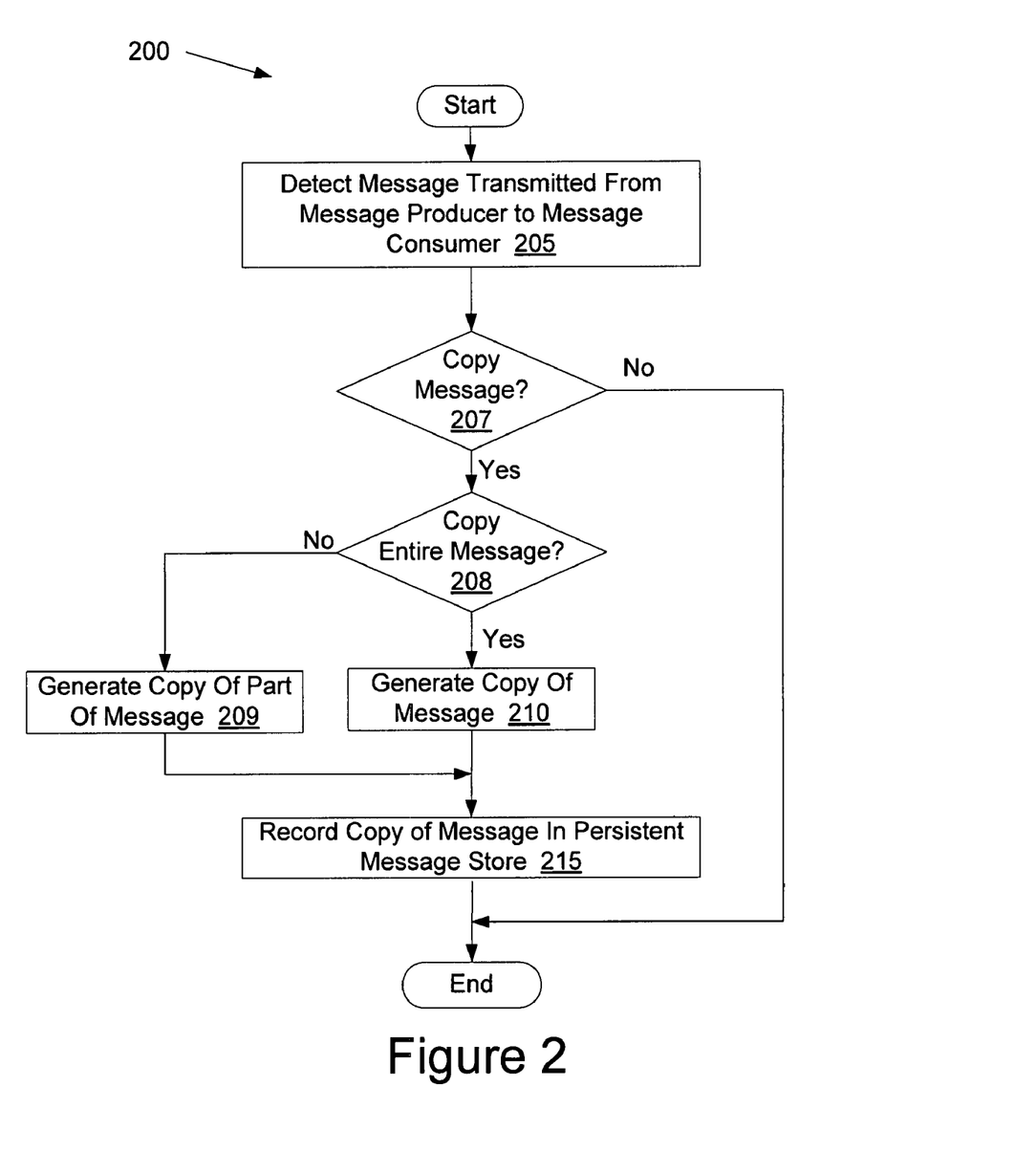
FIG. 2 illustrates a flow diagram of one embodiment for a method of maintaining a persistent message store in a distributed system.

FIG. 2 illustrates a flow diagram of one embodiment for a method 200 of maintaining a persistent message store in a distributed system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 200 is performed by one or more services of distributed computing system 100 of FIG. 1.

Referring to FIG. 2, method 200 begins with processing logic detecting a message transmitted from a message producer to a message consumer over an enterprise service bus (block 205). The message may detected by a message copying module, which may be a service of the ESB.

At block 207, processing logic determines whether the message should be copied based on predetermined criteria. Such a determination may be made based on contents of a message header, message context, message body, etc. In one embodiment, the determination of whether to store the message is made by a rules engine that uses one or more rules. If it is determined that the message should be copied, the method proceeds to block 208. If it is determined that the message should not be copied, the method ends.

At block 208, processing logic determines whether the entire message should be copied. If it is determined that the entire message should be copied, the method proceeds to block 210, and a copy of the entire message is generated. If it is determined that only part of the message should be copied, the method proceeds to block 209, and a portion of the message is copied.

At block 215, the copy of the message is stored in a persistent message store. In one embodiment, a determination of how the message should be stored in the persistent message store is made by a rules engine that applies one or more rules. The method then ends.

Figure 3:
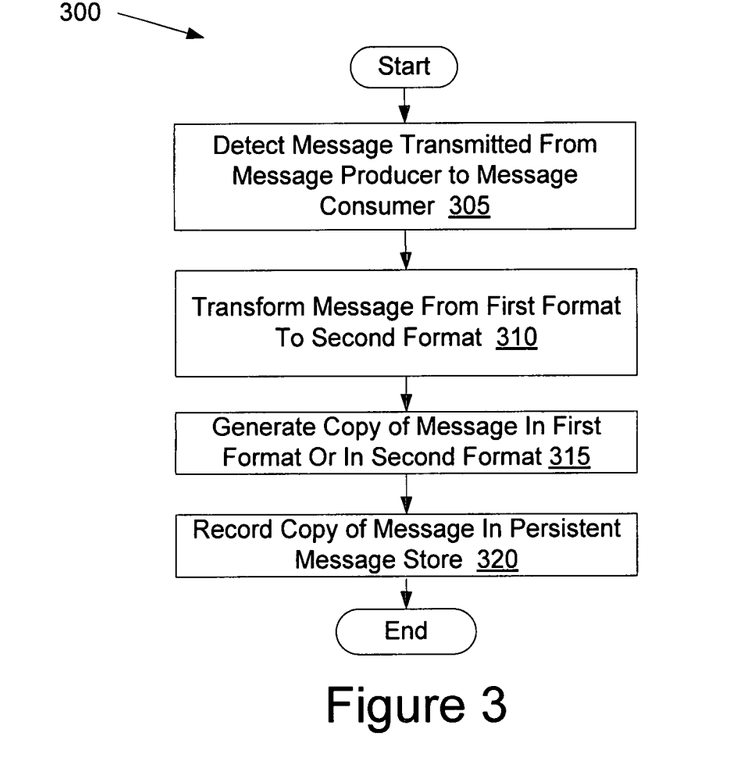
FIG. 3 illustrates a flow diagram of another embodiment for a method of maintaining a persistent message store in a distributed system.

FIG. 3 illustrates a flow diagram of another embodiment for a method 300 of maintaining a persistent message store in a distributed system. The method may be performed by processing logic that may comprise hardware (e.g., circuitry, dedicated logic, programmable logic, microcode, etc.), software (such as instructions run on a processing device), or a combination thereof. In one embodiment, method 300 is performed by one or more services of distributed computing system 100 of FIG. 1.

Referring to FIG. 3, method 300 begins with processing logic detecting a message transmitted from a message producer to a message consumer (block 305). The message may be intercepted and routed by a content based router, which may be a service of an ESB. At block 310, the message is transformed from a first format to a second format. The first format may be a format readable by the message producer, and the second format may be a format readable by the message consumer. In one embodiment, the message is transformed by a message transformation service of the ESB.

At block 315, a copy of the message is generated by a message copying module, which may be a service of the ESB. The copy of the message may be generated in the first format or in the second format. At block 320, the copy of the message is stored in a persistent message store. The method then ends.

Figure 4:
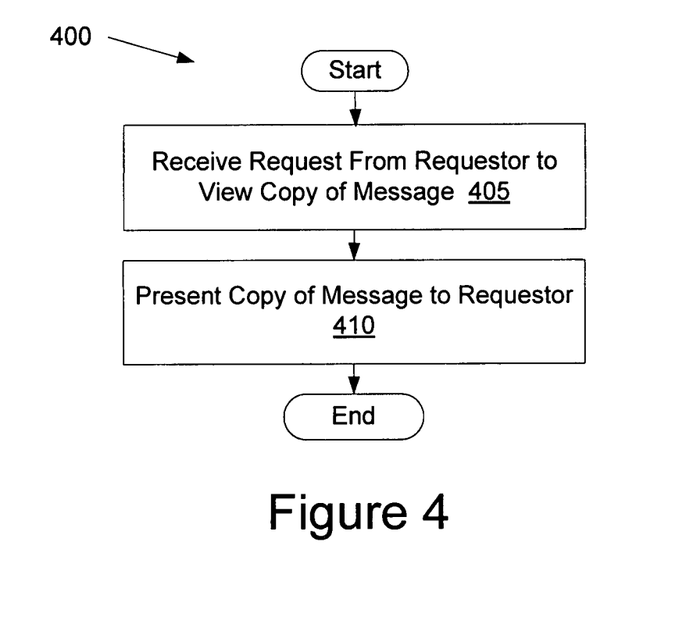
FIG. 4 illustrates a flow diagram of one embodiment for a method of using a persistent message store in a distributed system.

FIG. 4 illustrates a flow diagram of one embodiment for a method 400 of using a persistent message store in a distributed system. The method may be performed by processing logic that may comprise hardware (e.g., circuitry, dedicated logic, programmable logic, microcode, etc.), software (such as instructions run on a processing device), or a combination thereof. In one embodiment, method 400 is performed by one or more services of distributed computing system 100 of FIG. 1.

Referring to FIG. 4, method 400 begins with receiving a request to view a copy of a message (block 405). The copy of the message may be stored in a persistent message store. The request may be received from a service or a client, and may include search parameters to identify the copy of the message. Examples of search parameters include a unique identifier of the message, a timestamp, message body contents, message context, etc. At block 410, the copy of the message is presented to the requestor. Presenting the copy of the message may include sending the copy of the message to the requestor over a network. The method then ends.

In a non-deterministic system, given the same set of inputs, a service or client may generate different messages. The content of the generated messages may be based on, for example, a day of the week, a time of day, or some other variable which may or may not be temporal in nature. Therefore, when a system terminates prematurely (e.g., crashes), reproducing the system state that caused the premature termination is nontrivial. To facilitate recreation of a previous system state, a persistent message store may be used.

Figure 5:
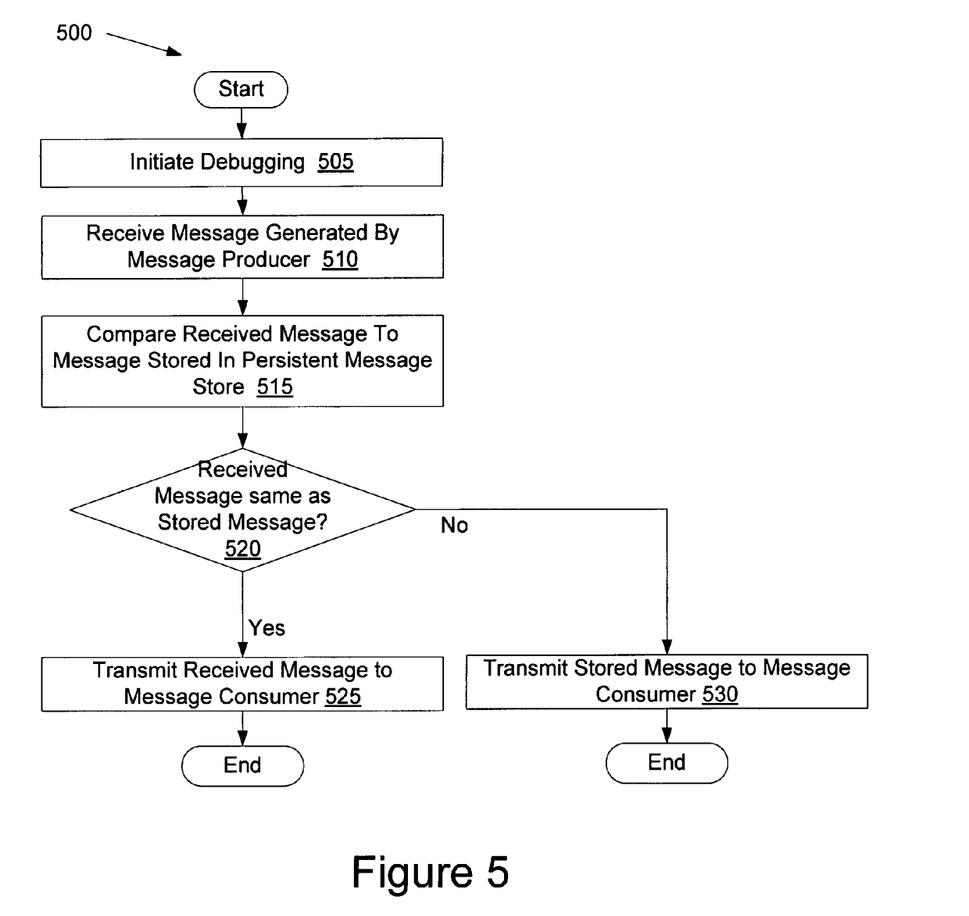
FIG. 5 illustrates a flow diagram of one embodiment for a method of debugging a distributed system using a persistent message store.

FIG. 5 illustrates a flow diagram of one embodiment for a method 500 of debugging a distributed system using a persistent message store. The method may be performed by processing logic that may comprise hardware (e.g., circuitry, dedicated logic, programmable logic, microcode, etc.), software (such as instructions run on a processing device), or a combination thereof. In one embodiment, method 500 is performed by one or more services of distributed system 100 of FIG. 1. In a further embodiment, the services are core services of an enterprise service bus (ESB).

Referring to FIG. 5, method 500 begins with initiating a debugging mode or a debugging environment (block 505). The debugging mode/environment may facilitate recreation of a previous system state that caused the system to terminate prematurely. This may be accomplished by reproducing and resending each message that was transmitted between services and clients prior to the premature termination.

At block 510, a message generated by a message producer is received. The message may be received by a debugging module. The received message may be a reproduction of an original message that was generated previous to a premature system termination, and may have a destination that is the same as a destination of the original message. However, in a non-deterministic system, the reproduction of the original message may not match the original message.

At block 515, the received message is compared to a message stored in a persistent message store. The stored message may be a copy of the original message that was stored in the persistent message store when the original message was previously transmitted.

At block 520, processing logic determines whether the received message matches the stored message. In one embodiment, a match occurs between an original message and a reproduction of the original message when the messages are identical. Alternatively, a match may occur when the messages are substantially the same. For example, a match may occur even though a time stamp differs.

If the received message matches the stored message, the method proceeds to block 525, and the received message is transmitted to a message consumer. If the received message does not match the stored message, the method proceeds to block 530, and the stored message is transmitted to the message consumer. This enables messages (and therefore transactions) to be recreated even in a non-deterministic system. Therefore, when a service or client receives a message in debugging mode, the received message will match (e.g., be the same as or substantially the same as) a message that it received previously (e.g., prior to a premature system termination).

Once debugging mode is initiated (block 505), blocks 510 through 530 may be executed for each message that is received. Therefore, an entire transaction or multiple transactions that preceded a premature system termination may be reproduced. For example, blocks 510 through 530 may be performed with a first message sent from a client to a user, then with a reply message sent from the service back to the client, and so on. This may ensure that each message matches its original counterpart that led up to a premature system termination.

Figure 6:
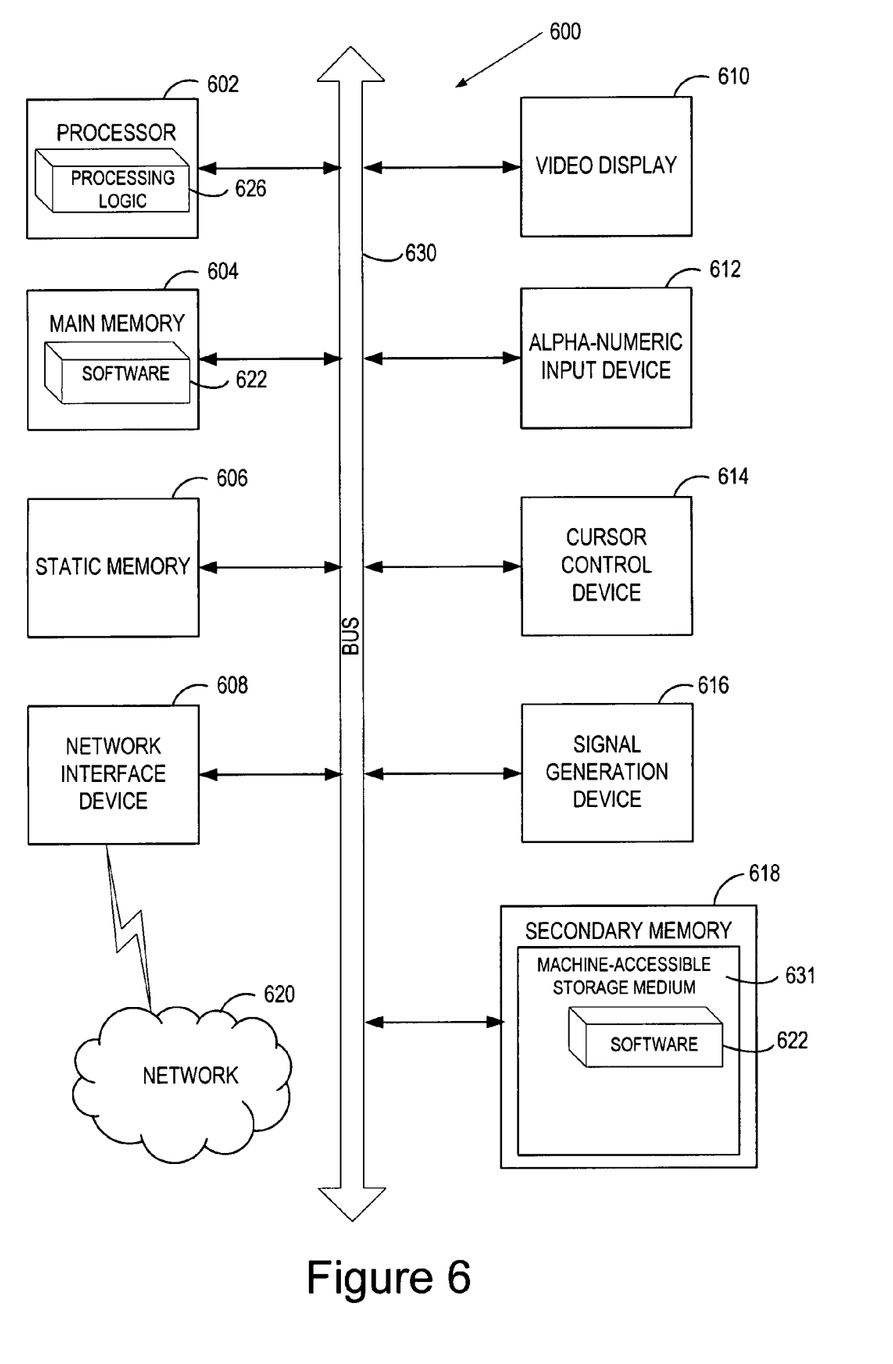
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-accessible storage media. The software 622 may further be transmitted or received over a network 620 via the network interface device 608.

The machine-accessible storage medium 631 may also be used to store data structure sets that define user identifying states and user preferences that define user profiles. Data structure sets and user profiles may also be stored in other sections of computer system 600, such as static memory 606.

While the machine-accessible storage medium 631 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for a service oriented architecture, comprising:
    detecting, by a computing device executing a content based router, a message that is transmitted from a message producer to a message consumer in a distributed computing system having a service oriented architecture;
    determining whether the message has a specified priority;
    determining whether there is an agreement with the message producer for copying messages generated by the message producer;
    determining whether there are any message copying restrictions, based at least in part on the agreement; and
    if the message has the specified priority, and there is an agreement with the message producer for copying messages, and there are message copying restrictions, performing the following:
    identifying, based on a predetermined criterion, portions of the message that are not to be copied;
    generating a copy of the message that does not include the portions of the message that are not to be copied; and
    sending the copy of the message that does not include the portions of the message that are not to be copied to a persistent message store for storage, wherein the portions of the message that are not to be copied are not stored.

2. The method of claim 1, further comprising:
    receiving a request from a requestor to view the copy of the message; and
    presenting the copy of the message to the requestor.

3. The method of claim 1, further comprising:
    transforming the message from a first format to a second format, the first format understandable to the message producer and the second format understandable to the message consumer, wherein the copy of the message is stored in one of the first format and the second format.

4. The method of claim 1, further comprising searching for the message in the persistent message store based on at least one of a message header, a message context and a message body.

5. The method of claim 1, wherein determining whether the message is to be copied includes analyzing the message with a rules engine that applies one or more rules.

6. The method of claim 1, wherein the message producer is at least one of a client and a service, and the message consumer is at least one of a client and a service.

7. The method of claim 1, wherein the distributed computing system includes an enterprise service bus for transmitting the message.

8. The method of claim 1, further comprising:
    adding information to the copy of the message indicating that the portions of the message that are not to be copied are not included in the copy of the message.

9. The method of claim 8, further comprising:
    adding additional information to the copy of the message identifying a reason why the portions of the message were not included in the copy.

10. A non-transitory machine-accessible storage medium including data that, when accessed by a machine, cause the machine to perform a method for a service oriented architecture, comprising:
- detecting, by a computing device executing a content based router, a message that is transmitted from a message producer to a message consumer in a distributed computing system having a service oriented architecture;
- determining whether the message has a specified priority;
- determining whether there is an agreement with the message producer for copying messages generated by the message producer;
- determining whether there are any message copying restrictions, based at least in part on the agreement; and
- if the message has the specified priority, and there is an agreement with the message producer for copying messages, and there are message copying restrictions, performing the following:
  - identifying, based on a predetermined criterion, portions of the message that are not to be copied;
  - generating a copy of the message that does not include the portions of the message that are not to be copied; and
  - sending the copy of the message that does not include the portions of the message that are not to be copied to a persistent message store for storage, wherein the portions of the message that are not to be copied are not stored.

11. The non-transitory machine-accessible storage medium of claim 10, the method further comprising:
- receiving a request from a requestor to view the copy of the message; and
- presenting the copy of the message to the requestor.

12. The non-transitory machine-accessible storage medium of claim 10, the method further comprising:
- transforming the message from a first format to a second format, the first format understandable to the message producer and the second format understandable to the message consumer, wherein the copy of the message is stored in one of the first format and the second format.

13. The non-transitory machine-accessible storage medium of claim 10, the method further comprising searching for the message in the persistent message store based on at least one of a message header, a message context and a message body.

14. The non-transitory machine-accessible storage medium of claim 10, wherein determining whether the message is to be copied includes analyzing the message with a rules engine that applies one or more rules.

15. The non-transitory machine-accessible storage medium of claim 10, wherein the message producer is at least one of a client and a service, and the message consumer is at least one of a client and a service.

16. The non-transitory machine-accessible storage medium of claim 10, wherein the distributed computing system includes an enterprise service bus for transmitting the message.

17. A distributed computing system, comprising:
a computing device executing instructions for a content based router, networked to a message producer and a message consumer, wherein the instructions cause the computing device to:
- intercept a message generated by the message producer;
- determine whether the message has a specified priority;
- determine whether there is an agreement with the message producer for copying messages generated by the message producer;
- determine whether there are any message copying restrictions, based at least in part on the agreement; and
- perform the following if the message has the specified priority, and there is an agreement with the message producer for copying messages, and there are message copying restrictions:
  - identify, based on a predetermined criterion, portions of the message that are not to be copied;
  - generate a copy of the message that does not include the portions of the message that are not to be copied; and
  - send the copy of the message that does not include the portions of the message that are not to be copied to a persistent message store for storage, wherein the portions of the message that are not to be copied are not stored.

18. The distributed computing system of claim 17, further comprising:
the persistent message store, coupled with the computing device, to store the copy of the message, wherein the persistent message store further to receive a request from a requestor to view the copy of the message, and to present the copy of the message to the requestor.

19. The distributed computing system of claim 17, further comprising the instructions to cause the computing device to transform the message from a first format to a second format, the first format understandable to the message producer and the second format understandable to the message consumer.

20. The distributed computing system of claim 17, wherein the message producer is at least one of a client and a service, and the message consumer is at least one of a client and a service.

21. The distributed computing system of claim 17, wherein the distributed computing system further comprises:
an enterprise service bus to transmit the message.

22. The distributed computing system of claim 17, further comprising:
the persistent message store, coupled with the computing device, to store the copy of the message, wherein the persistent message store is searched for the message based on at least one of a message header, a message context and a message body.

23. The distributed computing system of claim 17, wherein the computing device includes a rules engine and one or more rules to determine whether the message is to be copied.

* * * * *